United States Patent Office 3,419,532
Patented Dec. 31, 1968

3,419,532
POLYHALOGENOUS POLYURETHANE
PRODUCTS
Donald R. Jackson, deceased, late of Southgate, Mich., by Ruth H. Jackson, special administratrix, Southgate, Mich., assignor to Wyandotte Chemicals Corporation, Wyandotte, Mich., a corporation of Michigan
No Drawing. Filed Jan. 2, 1964, Ser. No. 335,433
4 Claims. (Cl. 260—77.5)

The present invention relates to polyurethanes, and is more particularly concerned with polyhalogenous polyurethanes and polyurethane compositions which exhibit improved fire resistant properties.

Many varieties of polyurethanes suitable for use as elastomers, coatings, foams, and the like are known in the art. Polyurethanes are generally prepared by reacting an organic compound which contains at least two active hydrogen atoms with an organic polyisocyanate, usually an aromatic diisocyanate.

The term "active hydrogen atoms" as used herein designates hydrogen atoms which are reactive as determined by the Zerewitinoff method. Included within this designation are the hydrogen atoms present in such radicals as hydroxy and thiol radicals. Polyethers and polyesters are most commonly used as the active hydrogen-containing compounds.

Several methods are available for preparing polyurethane resins. One method is commonly termed the "prepolymer" method. This method comprises reacting a stoichiometric excess of a polyisocyanate compound together with an active hydrogen-containing compound to form a prepolymer containing free isocyanate groups. The prepolymer is then mixed with an additional portion of active hydrogen-containing compound, usually in the presence of a catalyst. When the mixture is subjected to the proper conditions, the reactants polymerize and cross-link to yield the final product. The prepolymer method has the advantage that, by varying the structure and properties of the prepolymer, the properties of the final product may be more carefully controlled than in other methods.

Another method commonly used is the "one-shot" method. In this method, the polyisocyanate, the active hydrogen-containing compound, the catalyst, and any other reaction ingredients such as blowing agents in the form of water, volatile solvents, et cetera, when expanded compositions are desired as end products, are mixed together, as by the use of a multiple stream nozzle or a mixing head. The reaction mixture is then applied directly at the site where it is to be polymerized, such as in a form or mold. This method has the economic advantage that no intermediate prepolymer preparation steps are necessary.

A variation of the "one-shot" technique, termed the "premix" method, comprises initially mixing together the active hydrogen-containing compound together with catalysts and other ingredients, and then mixing this composition with the appropriate quantity of the polyisocyanate.

Numerous methods are available for forming expanded polyurethane compositions. In one method a sufficient amount of the isocyanate compound is added to the reaction mixture so that there will be excess isocyanate groups over the quantity required to react with the active hydrogen-containing compound. Water or a carboxyl group-containing compound is incorporated during the final cross-linking stage of the reaction. The water or acid reacts with the free isocyanate to form carbon dioxide, which is enclosed within the viscous mass as the reactants polymerize. The mass of foam expands as the generation of carbon dioxide continues. At this point the resin hardens or sets, resulting in a final product containing many small cells. It has also been found that when a substantial part of the blowing action is provided by the incorporation of lithium aluminum hydride, an excellent cellular material is obtained which is usually somewhat softer than products prepared by using the reaction between isocyanate and water to provide the carbon dioxide for the blowing action. The lithium aluminum hydride is normally used in amounts of about 0.1 to 1 percent by weight of the prepolymer.

In another process for producing cellular polyurethane products, an inert substance which is volatile under the exothermic conditions of the reaction is added to the reaction mixture prior to the final cross-linking. During the reaction heat is released, and the solvent vaporizes and becomes enclosed in the hardening mass, thereby producing the expanded product. Suitable volatile inert substances are the polyhalomethanes or polyhaloethanes, commonly marketed under the trademarks "Freon" and "Genetron."

Regardless of the method of manufacture, it is the usual practice of the art to introduce into the polyurethane foam reaction system a catalyst or accelerator to increase the rate of reaction of both linear polymerization and cross-linking. This practice is especially necessary in manufacturing foams or foamed articles, where the polymerization and the gas release must come to a stop at approximately the same time. When carbon dioxide is employed as a blowing agent, the setting of the foam before the completion of the release of the carbon dioxide may result in a final product whose density is too great. On the other hand, if release of carbon dioxide is completed before the foam sets, the foam may shrink or even collapse. It is the latter undesirable condition which occurs most often, i.e., the rate of polymerization and cross-linking is usually slower than the rate of reaction of the water and isocyanate, and thus the release of carbon dioxide. This is especially true when polyethers are utilized. When solvent blowing is employed, the relationship between the rate of polymerization and the rate of gas release must be carefully controlled to insure that the gas is retained within and uniformly distributed throughout the expanded product.

Catalysts commonly used in the prior art are tertiary amines. Among the more common ones are N-methylmorpholine, triethylamine, diethylethanolamine, N,N-dimethylpiperazine, 2,2,2-diazobicyclooctane, et cetera. Additionally, an appropriate catalyst may be chosen from among those described in U.S. Patent 2,846,408, and especially tin compounds such as the dialkyltin dicarboxylates, for example dibutyltin dilaurate, dibutyltin-bis-(2-ethylhexoate), et cetera, and the stannous carboxylates, including stannous octoate, stannouc oleate, et cetera.

Although polyurethane compositions have been found extremely useful for a variety of applications, such as wrapping materials, coatings and rubbers, with regard to unexpanded products, and insulating and cushioning materials, with regard to expanded products, their utilization in certain fields of manufacture has been restricted because of the fact that they are inflammable and readily support combustion. This is particularly true in the case of the foamed products.

Three general approaches for treating polyurethane compositions in order to improve their resistance to combustion have been suggested. These systems are:

(1) Physical incorporation of additives or fillers into the composition;

(2) Coating of the flammable composition with a non-flammable coating;

(3) Chemical incorporation of fire resisting additives, elements, and compounds into the composition.

The first listed method has probably been the most widely explored. Typical of the fire resistant additives are certain phosphates and phosphites and phosphorous- or phosphoric-esters which contain halogen atoms. These additives, when incorporated into the product, generally contribute toward rendering the composition self-extinguishing. However, the use of additives has attendant drawbacks, particularly in the case of foams, since some additives may act as plasticizers and may thus cause the impairment of such desirable properties of the untreated product as compressive strength and closed cell content. The presence of additives may even cause a foam to crumble and disintegrate. Such presence may tend to decrease the rigidity of a foam and thereby increase shrinkage.

Another disadvantage resulting from the use of additives resides in the fact that, although these compounds are generally stable under mild conditions, when exposed to severe weathering, they often break down, thereby leaving the polyurethane composition unprotected from the standpoint of flammability. In addition, in many cases it is not possible to retain these additive compounds permanently in the polymer. As a consequence, they gradually migrate to the surface and evaporate, resulting in a decrease in the flame-resistant properties of the composition with age.

Fire-resistant surface coatings are effective in protecting foams, and especially sprayed foams, from destruction by fire, but they too have some disadvantages. Their application requires an additional step in the production of the final product, and thereby contributes to increased costs. A break or fault in the coating may render the underlying foam susceptible to fire damage. In order to provide more complete protection, attempts have been made to combine the first system with the second, that is, to coat a foam containing a fire retarding additive with a fire-resistant layer. Although this method gives increased protection, the final product still suffers from the disadvantages of the separate processes, that is, degraded physical properties, and, especially, increased cost.

The third method comprises chemically incorporating additives into the composition. This has proved to be the most promising of all three methods. Various phosphorous compounds of polyoxyalkylene polyols have been utilized for this purpose in the prior art. Specific halogen-containing compounds, such as hexahalocyclopentadiene adducts of alcohols and acids, have also been found to be suitable for such use.

It is an object of the present invention to provide new polyurethane compositions which possess improved resistance to fire, and to provide methods for their preparation. An additional object is the provision of novel polyurethane compositions of improved fire-resistance and in which the normally present desirable properties of the unmodified composition are not degraded. Another object is to provide a new class of polyhalogenous polyurethane compositions which possess permanent resistance to fire, even after exposure to extreme weathering conditions. A further object is to provide a new class of fire resistant expanded polyurethane compositions which possess and retain a permanent resistance to fire. Additional objects will be apparent to one skilled in the art and still other objects will become apparent hereinafter.

It has now been found that the foregoing and additional objects of the present invention are accomplished by the provision of a new and hitherto unsuggested class of polyurethane compositions having a relatively high halogen content, which compositions are characterized by the presence of pendant lower-alkyl groups having a maximum of two carbon atoms and containing at least two halogen atoms bonded to the same terminal carbon atom of the pendant lower-alkyl group, said pendant lower-alkyl group being an extra-linear substituent of the active hydrogen-containing compound moiety of the polyurethane. These halogen-containing polyurethanes have been found to possess a high order of fire-resistance, being self-extinguishing and, in some instances, non-burning. Moreover, they do not suffer the disadvantages inherent in many previously proposed fire resistance-providing systems.

The term "self-extinguishing" as used herein is intended to denote a composition which will burn when directly exposed to a flame source, but which will stop burning once the flame source has been removed, and before the composition has been completely consumed. By "non-burning" is meant that the composition will not even begin to burn when directly exposed to a flame.

The polyhalogenous polyurethane compositions of the invention comprise the reaction product of an organic polyisocyanate and a polyfunctional active hydrogen-containing polyhalogenous polyhydroxy ether containing the pendant polyhalogenous lower-alkyl groups referred to above. A wide variety of suitable polyfunctional active hydrogen-containing compounds may be used in the present invention, and primarily include polyethers, polyesters, and polyester amides, as well as combinations thereof.

In order to obtain a polyurethane composition having certain desired properties, it may be advantageous to include in the polyurethanes, in addition to the polyisocyanates and the active hydrogen-containing compound, a third compound or mixture of compounds containing at least two functional groups capable of reacting with the polyisocyanate, or the functional groups of the active hydrogen-containing compounds, or both. The third compound may have no more than one halogen atom on any one carbon atom, or may be completely free of halogen atoms. Typical of such materials are polyamines, polyols, polycarboxylic acids and acid anhydrides, polyesters, polyethers, amino alcohols and acids, mercaptans, polyisocyanates, and polyester amides.

It is well known in the field of alkylene oxide chemistry that when a reactive hydrogen compound is subjected to oxyalkylation, a compound is produced which is in fact a polymer of the alkylene oxide, having the reactive hydrogen compound as a terminal group. Further, when a large proportion of alkylene oxide to reactive hydrogen compound is used, the reaction product is not a single molecular compound having a defined number of oxyalkylene radicals but, rather, a mixture of closely related or touching or adjacent homologs wherein the statistical average number of oxyalkylene groups equals the relative number of moles of the alkylene oxide employed, and the individual members present in the mixture contain varying numbers of polyoxyethylene groups. Thus, the polyether compositions previously described are mixtures of compounds which may be defined in terms of molecular weight and weight percent. For convenience in referring to such products as are produced by the alkylation process, the term "cogeneric mixture" is sometimes employed. This term has been coined to designate the mixture of a series of closely related homologs obtained by condensing a plurality of alkylene oxide units with a reactive hydrogen compound, and is defined in greater detail in U.S. Patent 2,549,438. Consequently, although throughout the specification and claims the products of the reaction between a polyhalogenous alkylene oxide and an active hydrogen-containing initiating compound are termed "ethers" or "polyethers," it is to be understood that these terms include within their meanings cogeneric mixtures of ethers and polyethers.

The reactions described above result in the production of polymers comprised of one moiety from the initiating compound and one moiety from the alkylene oxide. When two different alkylene oxides, as for example 1,1,1-trichloro-2,3-epoxypropane and propylene oxide, are used to form the polyether, the resulting structure may be either one of two types. If the two alkylene oxides are first mixed and then reacted together with the initiating compound, a "heteric" structure results, that is, one in which the molecules of the two alkylene oxides are randomly dispersed throughout the chain. Alternatively, when one alkylene oxide is first reacted with the initiating compound, and subsequently the second alkylene oxide is so reacted, a "block" type of polymer results. The structure of this type of polymer is comprised of a block of one polymerized alkylene oxide connected to a block of the other polymerized alkylene oxide.

POLYHALOGENOUS POLYHYDROXY POLYETHERS

The polyhalogenous polyhydroxy polyethers which may be utilized for the preparation of the polyurethanes according to the present invention comprise the reaction product of an alkylene oxide having from 3 to 4 carbon atoms, inclusive, and having a lower-alkyl group attached to the carbon atom of the oxirane ring, the alkyl group having a maximum of 2 carbon atoms and containing at least 2 halogen atoms attached to the same terminal carbon atom.

In one method the polyhalogenous polyether may be formed by homopolymerizing the polyhalogenous alkylene oxide. For example, 1,1-dichloro-2,3-epoxypropane may be polymerized in the presence of a suitable catalyst such as boron trifluoride to produce a polyether. Alternatively, two or more different polyhalogenous alkylene oxides may be copolymerized in the presence of a catalyst to produce a mixed polyether.

In order to modify the properties of the polyether further, an alkylene oxide having no more than one halogen atom on a single carbon atom, or an alkylene oxide free of halogen atoms, may be copolymerized with a polyhalogenous alkylene oxide or mixture thereof.

In order to be useful for reaction with a polyisocyanate compound to form a polyurethane, the polyether must be polyfunctional with respect to active hydrogen. Such polyhydroxy compounds may be prepared by incorporating a small amount of a polyhydroxy compound such as the glycol of the particular alkylene oxide used to form the polymer, or a small amount of an initiating compound as further described hereinafter. Alternatively, a small amount of a polyhydroxy compound may be reacted with a catalyst such as boron trifluoride to form the etherate thereof. Subsequently, when the modified catalyst is introduced into the reaction mixture, the polyhydroxy compound is incorporated into the polyether chain to provide terminal reactive hydroxy groups. As a further alternative, water may be utilized as the hydroxy initiating compound to prepare a homopolymer or copolymer which is polyfunctional. For example, water may be added to an alkylene oxide to form an alkylene glycol. More alkylene oxide may then be added to the glycol to form a polyfunctional polyether.

Another method for preparing the polyhalogenous polyether comprises copolymerizing a polyhalogenous alkylene oxide directly with a polyhydric alcohol initiating compound having a maximum of 8 hydroxy groups, or with a mixture of several such initiating compounds. Alternatively, the polyether may be prepared by copolymerizing a polyhalogenous alkylene oxide, an alkylene oxide having no more than one halogen atom on a single carbon atom or one completely free of halogen atoms, together with a polyhydroxy initiating compound.

During the reaction, the polyhalogenous alkylene oxide, as well as the alkylene oxide containing less than two halogen atoms, if such is used, reacts with the free hydroxy groups of the polyhydric alcohol initiator or the alkylene glycol to produce an adduct wherein the polyhydric alcohol initiator segment is bonded through one or more of its hydroxy groups to oxyalkylene radicals, which may in turn be bonded through their hydroxy groups to additional oxyalkylene radicals to produce a polyoxyalkylene chain. The adduct thus formed is characterized by the presence of pendant polyhalogenous alkyl groups. The average number of hydroxy groups of the polyhydroxy alcohol initiator bonded to oxyalkylene radicals and the average length of the polyoxyalkylene chains are primarily determined by the molar proportion of alkylene oxide to polyhydroxy compound.

Alkylene oxides react readily with hydroxy groups, Those on the initiating compound are available, and the initial reaction generally takes place with those groups. During the reaction, a terminal hydroxy group is formed on the alkylene oxide moiety and this group is subsequently available for reaction with other alkylene oxides. It appears that generally the reactivity of the alkylene oxide is greater toward the first hydroxy group of the hydroxy compound than towards the second hydroxy group of a hydroxy compound which has already been reacted through another hydroxy group with an alkylene oxide molecule. In a few exceptional cases, however, as where polyhydroxy initiators of higher functionality are used, this reaction selectivity may be less marked. Therefore, by controlling the relative amounts of the reactants it is generally possible to limit the degree of addition, and thus to control the molecular weight of the product. For example, it has been found in practice that, when the alkylene oxide and polyhydroxy compound are reacted in equimolar quantities, polyhydroxy ethers are obtained which substantially comprise adducts of one molecule of alkylene oxide and one molecule of hydroxy compound, although small amounts of diadducts and triadducts may additionally be formed. When the proportion of oxide to hydroxy compound is increased, the average number of alkylene oxide units to each hydroxy compound unit is correspondingly increased.

The polyhalogenous alkylene oxides which are employed as starting materials to prepare the polyethers are vicinal alkylene oxides containing from three to four carbon atoms, and having attached to a carbon atom of the oxirane ring a lower-alkyl group having up to two carbon atoms and containing at least two and preferably three halogen atoms attached to the terminal carbon atom. The term "oxirane ring" refers to a three-membered cyclic ether group represented by the formula:

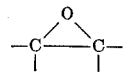

wherein the ether oxygen is bonded to adjacent carbon atoms. Representative of such polyhalogenous alkylene oxides are 1,1-dichloro-2,3-epoxypropane
1,1,1-trichloro-2,3-epoxypropane
1,1,1-trifluoro-2,3-epoxypropane
1-bromo-1,1-dichloro-2,3-epoxypropane
1,1-dichloro-1-fluoro-2,3-epoxypropane
1,1-difluoro-1-chloro-2,3-epoxypropane
other mixed 1,1,1-trihalo-2,3-epoxypropanes
1,1,1-tribromo-3,4-epoxybutane
1,1,1-trichloro-3,4-epoxybutane
1,1-dichloro-3,4-epoxybutane
1,1,1,2,2-pentachloro-3,4-epoxybutane
1,1,1,4,4-pentachloro-2,3-epoxybutane
1,1,1,2,2-pentafluoro-3,4-epoxybutane
1,1,1,2,2-mixed pentahalo-3,4-epoxybutanes, et cetera.

Tetrahaloepoxybutanes such as 1,1,4,4-tetrachloro-2,3-epoxybutane, 1,1,2,2-tetrachloro-3,4-epoxybutane and 1,1,1,2-tetrachloro-3,4-epoxybutane may also be used, as well as related compounds containing other halogens. As is obvious from these examples, the halogens bonded to these polyhalogenated alkylene oxides, and consequently to the pendant polyhalogenalkyl groups of the polyhalogenous polyhydroxy ethers and polyurethane compositions, may be any halogen or mixture of halogens. Of the halogens, those having atomic weights of 19 to 80, including fluorine, chlorine, and bromine, are preferred.

Preferably, all three of the substitutable valences of the terminal carbon atom of the polyhaloalkyl group are satisfied by halogen atoms.

The polyhalogenous epoxy propanes used in the present invention for the preparation of polyhalogenous polyhydroxy polyethers may be prepared by known methods such as by the dehydrohalogenation of the appropriate polyhalogenated secondary alcohol in sodium hydroxide solution. For example, 1,1-dichloro-2,3-epoxypropane may be prepared by the dehydrohalogenation of 1,1,3-trichloro-2-propanol. 1,1,1-trichloro-2,3-epoxypropane may be prepared by the dehydrohalogenation of 1,1,1,3-tetrachloro-2-propanol. The propanol used in the process may in turn be prepared in known manner by the reduction of the appropriate halogenated acetone with aluminum isopropoxide in isopropanol.

The preparation of 1,1-dichloro-2,3-epoxypropane may also be accomplished by treatment of epichlorohydrin with chlorine as described by Cloez in "Annales de Chimie et de Physique," [6]9:170 (1886).

1,1,1-trichloro-p,3-epoxypropane may also be prepared by the reaction of chloral with diazomethane in ether solution, as described by S. Schlotterbeck, Ber. 42, 2561 (1909).

The 1-polyhalogeno-3,4-epoxybutanes may be prepared by reacting the appropriate polyhalomethane with 1-hydroxypropene-2 in the presence of a source of free radicals, and dehydrohalogenating the resulting adduct with a base, as described in Canadian Patent No. 527,462. 1,1,1-trichloro-3,4-epoxybutane may be prepared by the partial dehydrohalogenation of 1,1,1-trichloro-3-bromo-4-butanol in the presence of potassium hydroxide, as disclosed in U.S. Patent No. 2,561,516.

When the polyhalogenous alkylene oxides react, the oxirane ring is opened with the breaking of an oxygen bond to form a bivalent radical wherein the members of the oxirane group form a bivalent linear chain having the polyhalogenous lower-alkyl group, originally attached to a carbon atom of the oxirane ring, as an extra-linear substituent. The bivalent oxyalkylene radical may be bonded through one valence by way of an ether linkage to the polyhydroxy initiating molecule, or through one or both valences to oxyalkylene radicals to form a polyoxyalkylene chain.

More than one of the above-described polyhalogenous alkylene oxides may be employed, as well as mixtures of the above-described polyhalogenous alkylene oxides with mono-halogenous or non-halogenous alkylene oxides. The use of such mixtures is often advantageous in that it may result in an improvement of some of the properties of the polyether, such as viscosity and color. For example, the use of a mixture of 1,1,1-trichloro-2,3-epoxypropane and propylene oxide (2:1 molar ratio) and utilizing trimethylolpropane as a chain initiating compound, results in polyhydroxy polyether products having reduced viscosity, improved color, and improved solubility in low boiling chlorofluoro-hydrocarbons, as for example the Freons, in comparison to the corresponding polyhydroxy polyethers prepared from 1,1,1-trichloro-2,3-epoxypropane alone. Suitable alkylene oxides which may be used as co-reactants with the polyhalogenous alkylene oxides are the alkylene oxides which are either saturated or free from other than aromatic unsaturation, and which contains no more than a single halogen atom. They include alkylene oxides such as ethylene, propylene, butylene, and isobutylene oxides, dodecene oxide, epichlorohydrin, epibromohydrin, et cetera, aromatic alkylene oxides such as styrene oxide, chlorostyrene oxide, et cetera, epoxy ethers, and so forth. When mixtures of polyhalogenous and non-polyhalogenous alkylene oxides are used to impart fire resistance into a composition, the amount of the non-polyhalogenous alkylene oxide should be limited. Thus, when a mono- or non-halogenous alkylene oxide is employed as part of the starting alkylene oxide reactant, it is preferred that the polyhalogenous alkylene oxide component comprise at least 10% by weight of the mixture.

In general, it has been found that a minimal halogen content of 45% by weight is normally required in the polyether in order to obtain polyurethanes having improved fire resistance. However, the fire-resistant properties of the polyurethane compositions do not depend solely on the halogen content of the polyether, but also on other factors, such as for example the structure of the composition itself.

A wide range of polyhydroxy initiating compounds containing from two to eight hydroxy groups, inclusive, may be used to prepare the polyether intermediates used in the present invention. Aliphatic, cycloaliphatic and aromatic polyhydric alcohols are preferred, but others may also be used, including polyhydric ether alcohols, polyhydroxy ketones and aldehydes, polyhydroxy esters, polyurethane gylcols, polyester amide glycols, et cetera. The polyhydroxy compounds used in preparing the polyether intermediates of the present invention also include those polyhydroxy-substituted compounds with groups unreactive to epoxy groups, such as halogen.

Representative polyhydric alcohol initiators include glycols such as ethylene glycol, propylene glycol, isobutylene glycol, trimethylene glycol, butanediol-2,3, 1,4-dihydroxy-2-butene, 1,12-dihydroxy octadecane, 1,4-dihydroxycyclohexane, 2,2-dimethyl-1,3-propanediol, 2-ethyl-2-butylpropanediol-1,3, polyols such as glycerine, erythritol, sorbitol, mannitol, inositol, trimethylolpropane, pentaerythritol, and alpha methylglucoside, as well as polyvinyl and polyallyl alcohol, bis(4-hydroxycyclohexyl)dimethylmethane, tetramethylolcyclohexanol, 1,4-dimethylolbenzene, 4,4'-dimethyloldiphenyl, dimethylolxylenes, dimethyloltoluenes, dimethylolnaphthalenes, et cetera; halogen-substituted polyols such as glycerine monochlorohydrin, 1,4-dichloro-2,3-hydroxybutane, 2,2,3,3-tetrachlorobutanediol-1,4, 3,3,3-trichloro-1,2-propylene glycol, 3,3-dichloropropanediol-1,2, monochlorohydrin of pentaerythritol, monochlorohydrins of sorbitol, dichlorohydrins of sorbitol, monochlorohydrins of mannitol, dichlorohydrins of mannitol, those glycols corresponding to the polyhalogenated alkylene oxide employed, et cetera; polyhydric ether alcohols such as diglycerol, triglycerol, dipentaerythritol, tripentaerythritol, dimethylolanisols, methylether of glycerine, isopropyl thioether of glycerine, condensates of alkylene oxides such as ethylene oxide, propylene oxide, butylene oxide, epichlorohydrin, glycidyl ethers, et cetera, with polyhydric alcohols such as the foregoing and with polyhydric thioether alcohols such as 2,2'-dihydroxydiethylsulfide, 2,2',3,3'-tetrahydroxydipropylsulfide, 2,2', 3-trihydroxy-3'-chlorodipropylsulfide, et cetera; hydroxy aldehydes and ketones such as dextrose, fructose, glyceraldehyde, et cetera; hydroxy esters such as monoglycerides, monoesters of pentaerythritol, et cetera.

One of the primary considerations in selecting a polyhydroxy initiator is the functionality desired in the polyhydroxy polyether product. An examination of the structure of the products obtained confirms the fact that the functionality of a polyhydroxy ether is the same as the functionality of the initiating compound used to prepare it. For example, when a triol is used as the polyhydroxy initiating compound, a trihydric ether is obtained as the product. When a tetrol is used as the initiating compound, a tetrahydric ether is obtained. When these ethers are to be used in the preparation of polyurethanes, the degree of functionality directly influences the degree of cross-linking in the polyurethane composition and, consequently, the rigidity and hardness of the product. In general, the greater the degree of cross-linking, the harder and more rigid the product. Consequently, more highly functional polyhydroxy polyethers are normally preferred when preparing hard, rigid polyurethane products. When softer, more flexible polyurethane foams are desired, less highly functional polyhydroxy ethers, such as dihydric ethers, should be utilized, and consequently, less highly functional polyhydroxy initiating compounds should be employed for the preparation of the polyethers.

By controlling the proportions of alkylene oxide to polyhydric initiating compounds, it is generally possible to limit the degree of addition, and, consequently, the molecular weight of the products. Molar excesses of polyhydroxy initiating compounds are preferred when the mono adduct is desired. Adducts having an average composition of one alkylene oxide unit per hydroxy group of the polyhydroxy initiating compound can be obtained by reacting the alkylene oxide with the polyhydroxy initiating compound in a ratio of one mole of alkylene oxide per hydroxy group of the initiating compound. For example, a three to one adduct of 1,1,1-trichloro-2,3-epoxypropane and glycerine is obtained by reacting three moles of the alkylene oxide with one mole of the triol. Higher polymeric products are obtained if the molar ratio of oxide to hydroxy compound is increased still further.

In general, it is preferred to use a ratio of about 1 to 4 moles of alkylene oxide per mole of polyhydroxy initiating compound for each hydroxy group of the polyhydroxy initiating compound, although, if desired, more or less may be used. Thus, for example, the preferred ratios of alkylene oxide to glycerine are in the range of about 1:1 to about 12:1.

A variety of catalysts may be employed to effect the reaction of the alkylene oxide, with or without the polyhydric initiator. The catalysts include those of the Friedel-Crafts type such as boron trifluoride, ferric chloride, anhydrous aluminum trichloride, zinc chloride, stannic chloride, antimony trifluoride, and complexes of these catalysts, such as boron trifluoride etherates, et cetera; acid type catalysts such as hydrofluoric acid, acid fluoride salts such as potassium acid fluoride, fluoboric acid, fluosilicic acid, fluoplumbic acid, perchloric acid, sulfuric acid, phosphoric acid, et cetera; other catalysts such as antimony pentachloride, alkoxides and alcoholates of aluminum, et cetera. The preferred catalysts are of the Lewis acid type, including the aforesaid Friedel-Crafts and acid types, and especially boron trifluoride and its etherates. The amount of catalyst to be used depends on the compound used as catalyst and upon the reaction conditions. Amounts of catalyst up to 10% by weight based on the amount of reactants may be used, with smaller amounts, e.g., up to 2% or 3%, being generally satisfactory and economically preferred. For example, when boron trifluoride is used as the catalyst, good results are obtained with amounts ranging from a few hundredths of 1% to 5%, the preferred range being from about 0.17% to 0.5%, based on the total quantities of reactants. When small amounts of catalyst are used, the rate of reaction is generally slower, and it may be necessary to use higher reaction temperatures.

It has also been found that certain of the polyhalogenated alkylene oxides will polymerize at high temperatures with polyhydroxy initiators even in the absence of a catalyst. For example, 1,1-dichloro-2,3-epoxypropane and 1,1,1-trichloro-2,3-epoxypropane were each successfully reacted with trimethylolpropane in the absence of catalysts at 175 to 200° C. However, the extent of such reaction is limited, for example, to no more than about 2.5 moles of oxide per mole of hydroxy compound when triols are used as the polyhydroxy initiating compound. The use of a catalyst, therefore, is normally preferred.

Often it is advantageous to introduce the catalyst in a solvent or carrier. For example, boron trifluoride, which is a gas under normal conditions, is most conveniently used in the form of its etherate. As previously stated, the reaction itself may be conducted with or without a solvent. If a solvent is desired, preferred solvents are those which are substantially unreactive to the reactants and products, and include aromatic and non-aromatic hydrocarbons, halogenated hydrocarbons, ethers, et cetera. Suitable solvents are hexane and benzene, and combinations thereof with halogenated hydrocarbons such as Freons. In general, it is not necessary to use a solvent and good results can be obtained without one.

The molecular weight of the polyether intermediate depends on a number of factors, such as type of solvent used, concentration and type of catalyst, time and temperature of reaction, and proportion of reactants. In general, increases in time and temperature of reaction, increase in concentration of catalyst and ratio of epoxide to initiating molecule will all operate to increase the molecular weight.

The polymerization of the polyhalogenated alkylene oxide with an initiating compound can be carried out in a variety of ways. In one method, the catalyst, with or without a diluent, is added to a mixture of alkylene oxide and polyhydroxy initiating compound. A mildly exothermic reaction generally results and can be cooled externally. The mixture is maintained at a suitable reaction temperature for a period of time until the reaction goes to completion. The product is then purified by any convenient procedure as, for example, vacuum stripping. In a variation of this method, a mixture of the polyhaloalkylene oxide and polyhydroxy initiating compound is initially reacted in the presence of a reaction catalyst, and then treated with additional alkylene oxide. A wide range of temperatures from about 25° to about 225° C. may be used, and preferably between 60° and 100° C.

In an alternate procedure the alkylene oxide is added gradually over a period of time to a mixture of catalyst and initiator. This method has the advantage that the epoxide may be added at such a rate that the heat of the exothermic reaction keeps the reaction mixture at a satisfactory temperature without external heating or cooling. In a variation, a mixture of all or part of the reactants are added gradually to the reaction zone. The procedure may be the same whether one or more polyhaloalkylene oxides or mixtures thereof with non-polyhaloalkylene oxide are employed as reactants, and whether or not more than one polyhydroxy initiating compound are employed as reactants.

After the reaction has gone to completion, the product may be purified by an suitable means, such as stripping under vacuum.

When the polyhalogenated alkylene oxides are polymerized without a polyhydroxy initiating compound, the catalyst and alkylene oxide can be mixed, with or without a solvent, and the resulting mixture maintained at a suitable temperature until completion of the reaction. Temperatures as low as −70° C. to temperatures above the boiling point of the reactants may be successfully used, with temperatures below 80° C. being normally preferred for obtaining products having the best color properties.

POLYISOCYANATE

Any of a wide variety of organic polyisocyanates may be employed in the reaction, including aromatic, aliphatic and cycloaliphatic diisocyanates and combinations of these types. Representative compounds include aromatic diisocyanates, such as 2,4-tolylene diisocyanate, mixtures thereof with 2,6-tolylene diisocyanate (usually about 80/20), 4,4'-methylene-bis(phenylisocyanate), and m-phenylene diisocyanate. Aliphatic compounds such as ethylene diisocyanate, ethylidene diisocyanate, propylene-1,2-diisocyanate, butylene-1,3-diisocyanate, tetramethylene diisocyanate, hexamethylene diisocyanate, decamethylene diisocyanate, and alicyclic compounds such as 1,2- and 1,4-cyclohexylene diisocyanates, and 4,4'-methylene-bis(cyclohexyl-isocyanate) are also operable. Arylene diisocyanates, i.e., those wherein each of the two isocyanate groups is attached directly to an aromatic ring, react more rapidly with the polymeric glycols or polyols than do the alkylene diisocyanates. Compounds such as 2,4-tolylene diisocyanate in which two isocyanate groups differ in activity are particularly desirable. The diisocyanates may contain other substituents, although those which are free from reactive groups other than the two isocyanate groups are ordinarily preferred. In the case of aromatic compounds, the isocyanate groups may be attached either to the same or to different rings. Dimers of the monomeric diisocyanates and di(isocyanatoaryl) ureas such as di(3-isocyanato-4-methylphenyl)urea may be used. Additional polyisocyanates which may be employed, for example, include: p,p'-diphenylmethane diisocyanate, 3,3' - dimethyl-4,4'-biphenylene diisocyanate, 3,3'-dimethoxy-4,4'-biphenylene diisocyanate, 4,4'-biphenylene diisocyanate, 4-chloro-1,3-phenylene diisocyanate, 3,3'-dichloro-4,4'-biphenylene diisocyanate, triphenylmethane triisocyanate, and 1,5-naphthalene diisocyanate, and other polyisocyanates in a blocked or semi-inactive form such as the bisphenylcarbamates of tolylene diisocyanate, xylylene diisocyanate, p-phenylene diisocyanate, and 1,5-naphthalene and 1,5-tetrahydronaphthalene diisocyanates.

POLYURETHANES

The polyurethanes of the present invention are obtained by generally following known procedures for preparing polyurethanes from polyethers, in which the polyether is replaced by the present polyhalogenous polyhydroxy polyethers containing pendant polyhaloalkyene groups. The resulting polyhalogenous polyurethanes are characterized by a high halogen content by virtue of having pendant polyhalogenoalkyl groups, and, consequently, a high degree of non-flammability, being generally self-extinguishing, and, in some cases, non-burning. Moreover, the fire-resistant properties are permanently retained. Further, according to the present invention, expanded polyurethanes may be prepared by reacting organic polyisocyanates with the polyhalogenous polyethers, while supplying a foaming or blowing agent to the reaction zone. When expansion by means of carbon dioxide formed in situ is employed, an excess of polyisocyanate must be present to react with water to yield carbon dioxide. The amount of water added should be such that the ratio of water equivalent to residual isocyanate equivalent, that is, the isocyanate which is present as excess isocyanate over the reactive groups of the active hydrogen-containing compounds, is preferably kept within the range of from 0.5 to 1.5 equivalents per equivalent of isocyanate, and most preferably within a range of about 0.8 to 1.2 equivalents per equivalent of isocyanate.

Expansion of a polyurethane may also be accomplished by means of a blowing solvent. About 1% to 15% of the blowing solvent, based on the total weight of the reactants, may be used. By varying the amount of solvent, together with other minor variations in formulation, foams having densities of from one to twenty pounds or more per cubic foot may be produced. When the density of the foam reaches a value below about 1.2 pounds per cubic foot, there is a tendency for the foam to shrink when the surface skin is removed from the body of the foam. It has also been found that when halogenous hydrocarbons such as the Freons are used as the blowing agent, variations in the amount of blowing agent also affect the self-extinguishing time of the foam, with self-extinguishing time decreasing when greater amounts of blowing agent are used.

Whether using the one-shot, premix, prepolymer procedure, or any other procedure or variation, the combined reactants, after initial mixing, are introduced into a mold and the foam is permitted to rise freely to full height, usually over a period of several minutes. The reactants may be introduced into the mold according to any of the well-known procedures which have been devised in the art, such as by the use of a mixing nozzle. It is essential that the mixing of the reactants be complete and rapid, since polymerization begins almost immediately. The reactants polymerize rapidly and the foam expands, taking the shape of the mold or container. The mold may have the shape of the desired article, as in foamed-in-place applications, or it may simply be in the form of an open pan. Often such pans contain upright pegs or cores so that the bottom surfaces of the urethane foams have cored openings, thereby saving space and enabling the foam to be of a higher density for a given load-deflection characteristic.

In order to produce a high grade foam, it is necessary to use a wetting agent or surfactant since, in the absence thereof, the foams collapse or develop very large uneven cells. Numerous wetting agents have been found satisfactory. Non-ionic surfactants and wetting agents are preferred. Of these, the non-ionic surface active agents are preferred. Of these, the non-ionic surface active agents prepared by the sequential addition of propylene oxide and then ethylene oxide to propylene glycol, such as those commercially available under the trademark Pluronic, and the solid or liquid water-soluble organosilicones, especially those marketed by the Silicone Division of Union Carbide Co., have been found particularly desirable. Other surface active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The quantity of surfactant or wetting agent utilized in the reaction mixture is also of significance, although this is somewhat dependent on the efficiency of the wetting agent. Generally, from about 0.05% to about 2% of surfactant, based on the total weight of the reactants, is adequate. In smaller quantities the surfactant tends to be ineffective, while, in larger amounts, no improvement in foam properties can be found. In fact, large amounts tend to decrease foam strength, yielding more flexible products. The optimum amount appears to be 0.5% by weight, especially when the preferred wetting agents are used.

Elastomers and coatings may be prepared by reacting approximately equal equivalents of polyisocyanate and active hydrogen-containing compound in either a one-shot or prepolymer procedure. When heated in the presence of a catalyst, the mixture polymerizes, yielding the desired product. When polyurethane coatings are desired, the polyisocyanate and polyether may be mixed either in or without a solvent and spread upon the surface by similar means such as dipping, roller coating, knife coating, brushing or spraying. Upon heating, the polymerization of the reaction products and evaporation of solvent are accomplished.

Although it is preferred that the present polyhalogenous polyethers be the sole active hydrogen-containing compound used in the preparation of the polyurethane composition, other polyfunctional compounds which contain at least two groups capable of reaction with either the polyisocyanate or the terminal group of the polyether, or both, may be used. Some examples of such functional groups capable of reacting with the terminal groups of either the polyisocyanate or the polyhydroxy ether, or both, are hydroxy, carboxy, amino, and thiol groups. Examples of such additional components are polyols, polyethers, polyesters, dicarboxylic acids and anhydrides, polyamines, mercaptans, amino alcohols, amino acids, et cetera. When such additional components are used with the polyhalogenous polyhydroxy ethers, the amount permissible is limited, and it is preferred that the amount of polyhalogenous polyhydroxy ether be no less than about 10% by weight of the total of the polyhalogenous polyhydroxy ether together with the additional component. Such additional components may be used to increase the crosslinking density of the polyurethane as, for instance, in the case when a compound containing three or more functional groups is used, or to vary or alter the properties of the product otherwise. Therefore, also included within the scope of the present invention are those polyesters and polyester amides which are generally the reaction product of a polybasic carboxy compound and a polyhalogenous polyether, and, in the latter case, also an amino compound. These compounds can be prepared by reacting a polyhalogenous polyether, prepared as disclosed above, with the polybasic carboxyl compound or, where polyester amides are desired, with an amine or amino alcohol, or by including the additional component in the reaction mixture when preparing the polyhalogenous polyether.

It is also within the scope of the present invention to incorporate plasticizers, fillers, additives, et cetera, into the polyurethane compositions, examples being pigments, reinforcing materials, auxiliary flame retardants, anti-oxidants, and so forth.

The products obtained according to the present invention are useful in almost all applications in which polyurethane materials have been used, and especially in applications where the improved fire-resistant properties of these polyurethanes are of special value. Included within the scope of the invention are applications where standard polyurethanes have not been previously used due to their flammability. Thus, the present compositions may be utilized as foams for various insulating, structural, and filling applications, where they can act as insulators and sound absorbers, as well as adding to the structural rigidity and strength. Light weight foams are useful for many different applications where weight is an important factor, as for structural applications in aircraft and for buoyancy applications in boats. Soft, flexible foams may be used for cushioning applications where improved fire-resistance is especially desirable, as in seats for furniture, automobiles, airplanes, and buses. Polyurethane elastomers may serve as molds for the casting of machinery pieces, for example gears, and other molded or cast items requiring molds having improved fire-resistance. They may be applied as coatings to wood, metal, plastics, and other surfaces. Paints may be prepared by combining the polyhalogenous polyether and the organic polyisocyanate in an appropriate solvent, and applying the resulting solution on a substrate by any appropriate method, such as brushing, rolling, et cetera. Appropriate solvents are, for example, diethylene glycol diethylether, benzene, toluene, xylene, et cetera.

When properly formulated, the present compositions may be used as tough and extremely durable rubbers. The polyurethanes of the present invention, especially those based on the homopolymers of the polyhalogenous alkylene oxides can be utilized as adhesives. The polyhalogenous polyurethane films frequently show increased adhesion when compared with films from urethanes prepared from the corresponding non-halogenous ethers. They also exhibit greater toughness and rigidity. Many additional uses will be recognized by one skilled in the art.

The subject invention is more specifically illustrated but not in any way limited by the following specific examples of the preparation of the compounds of this invention.

Example 1.—Expanded polyurethane composition from a polyether of 1,1-dichloro-2,3-epoxypropane and glycerine A 3:1 molar ratio polyether was prepared by adding 127 g. (1 mole) 1,1-dichloro-2,3-epoxypropane gradually to a mixture of 32 g. (0.33 mole) of 95% glycerine and 2 ml. of boron trifluoride etherate over a period of 3½ hours. The temperature of the reaction mixture was maintained at 30° to 40° C. by intermittent external cooling. Upon completion of the reaction, the volatile materials remaining were removed by vacuum distillation. The polyether residue was a very viscous amber-colored liquid. The calculated yield was 100% of the theoretical yield, and had a hydroxyl number of 348, which corresponds to a molecular weight of 483. The theoretical molecular weight of a 3:1 ratio adduct is 473.

The following reactants in the stated amounts were used to prepare an expanded polyurethane composition:

| | | |
|---|---|---|
| 1,1-dichloro-2,3-epoxypropane - glycerine polyether as prepared above | g | 20 |
| Freon 11 (trichlorofluoromethane) | g | 6 |
| Tolylene diisocyanate | g | 11.6 |
| L-520 (silicone foam stabilizer) | drops | 4 |
| Stannous octoate | do | 4 |

The first four of the above-listed materials were introduced into a 3-inch diameter paper cup and mixed well with a motor-driven stirrer. The stannous octoate was then added to the resulting mixture. The reaction mixture foamed immediately. When the reaction was complete, a symmetrical section 1 inch thick and 3 inches in diameter was cut from the expanded product and placed on a wire gauze, where it was exposed to the flame of a Bunsen burner for 13 seconds. When the flame was removed, the sample immediately stopped burning. For comparison, similarly shaped samples obtained from foams prepared from standard polyethers were subjected to the same flame test. They all continued to burn after the flame was removed, until they were completely consumed (L-520 silicone is a water-soluble dimethylpolysiloxane polyoxyalkylene copolymer, molecular weight 6500–7500).

Example 2.—Expanded polyurethane composition from a polyether of 1,1,1-trichloro-3,4-epoxybutane and ethylene glycol Utilizing the method described in Example 1, a polyether adduct was first prepared by reacting 2 moles of 1,1,1-trichloro-3,4-epoxybutane with 1 mole of ethylene glycol.

A uniform mixture of the following reactants was prepared:

| | | |
|---|---|---|
| 1,1,1-trichloro-3,4-epoxybutane-ethylene glycol polyether | g | 10 |
| L-520 (silicone foam stabilizer) | drop | 1 |
| Stannous octoate | drops | 2 |
| Freon 11 | g | 1 |

Into the mixture prepared above were introduced 4.2 g. of tolylene diisocyanate. The composition immediately began to foam. A test sample piece prepared as above from the completed foam was subjected to the above-described flame test. When the burner flame was removed, combustion of the test piece immediately stopped.

Examples 3 through 9.—Expanded polyurethane compositions from polyhalogenous polyethers Various polyhalogenous polyhydroxy polyether intermediates were prepared using mixtures of 1,1,1-trichloro-2,3-epoxypropane and propylene oxide. Preparation of the various polyether intermediates is summarized in Table I. In each preparation, the polyhydroxy initiating compound and catalyst were first mixed together and heated to the reaction temperature. The alkylene oxide reactant, a mixture of 1,1,1-trichloro-2,3-epoxypropane and propylene oxide, was then added gradually over a period of time which is listed for each preparation in the column headed "Addition, Time." After addition of the oxide was complete, the reaction mixture was maintained at the desired temperature, recorded in the column headed "Temp., ° C.," for an additional length of time in order to drive the reaction to completion. The polyhydroxy polyethers were then isolated by vacuum stripping the reaction mixture, the residue remaining after stripping being the desired product. The catalyst for each preparation was 10% by weight boron trifluoride etherate, based on the hydroxy initiating compound.

In each instance where mixtures of polyhydroxy initiating compounds were used, the ratios given are molar ratios. For convenience, 1,1,1-trichloro-2,3-epoxypropane is represented as TCEP and propylene oxide as PO.

TABLE I.—PREPARATION OF POLYHALOGENOUS POLYHYDROXY POLYETHERS

| Example | Oxide Used, moles (1) | | Total Oxide Used, grams | Initiating Compound (2) | Initiating Compound, grams (1) | Mole Ratio (2) | Reaction Conditions | | Stripped Products | |
|---|---|---|---|---|---|---|---|---|---|---|
| | TCEP | PO | | | | | Temp., °C. | Addition Time, min. | Total Time, min. | Weight, grams | Percent of Theory |
| 3 | 1.57 | 0.6 | 288 | Sorbitol | 46.0 | 8.6 | 64–81 | 91 | 121 | 313 | 94 |
| 4 | 1.76 | 1.03 | 344 | 2:1 Trimethylolpropane:Sorbitol | 66.0 | 6.4 | 48–68 | 102 | 159 | 381 | 93 |
| 5 | 1.6 | 0.8 | 305 | do | 40.0 | 9.0 | 39–57 | 151 | 173 | 319 | 93 |
| 6 | 1.89 | 0.63 | 341.5 | Glycerine | 57.9 | 4.0 | 50–56 | 83 | 148 | 382 | 96 |
| 7 | 1.89 | 0.63 | 341.5 | 2:1 Glycerine:Sorbitol | 57.7 | 4.0 | 49–58 | 81 | 142 | 389 | 97 |
| 8, 9 | 1.69 | 0.85 | 322 | Glycerine | 51.5 | 4.5 | 55–60 | 77 | 128 | 358 | 96 |

PREPARATION OF EXPANDED POLYURETHANES

Expanded polyurethanes were prepared from the polyhalogenous polyhydroxy polyethers and tolylene diisocyanate (TDI) using an 80–20 mixture of 1,2,4-trimethylpiperazine and stannous octoate as catalyst. The reactions and results are summarized in Table II. The results of the burning tests of the polyurethanes are given in the column headed "Self-Extinguishing Time." In each case, a sample of the polyurethane foam was directly exposed to a Bunsen burner flame for 13 seconds, and time in seconds necessary for the foam to stop burning after removal of the flame source recorded. The isocyanate index is the equivalent ratio of isocyanate groups to hydroxy groups.

ture of trimethylpiperazine and stannous octoate as a catalyst. In each case, 12.6 g. to 13.2 g. of tolylene diisocyanate, 30 g. of polyol, and 0.2 g. of silicone (DC199), a siloxane-polyoxyalkylene copolymer, were used, and the amount of Freon 11 varied. In the first foam, 5 g. of Freon 11 were used, to produce a foam having a density of 3.2 pounds per cubic foot, and a self-extinguishing time of 32 seconds. In the second foam, the amount of Freon 11 was increased to 7.5 g., producing a foam having a density of 2.2 pounds per cubic foot, and a self-extinguishing time of 24 seconds. In the third foam, the amount of Freon 11 was increased to 10 g., producing a foam having a density of 1.8 pounds per cubic foot, and a self-extinguishing time of eleven seconds. The second

TABLE II.—URETHANE FOAM PREPARATION AND BURNING TIMES

| Example | Initiator | TCEP:PO Mole Ratio | Functionality | Hydroxyl Number, Equivalent Weight | Percent Cl | Isocyanate Index | Foam Density, lbs./cu. foot | Self-Extinguishing Time, seconds |
|---|---|---|---|---|---|---|---|---|
| 3 | Sorbitol | 2.6 | 6 | 223 | 47.3 | 1.20 | 2.1 | 15 |
| 4 | Trimethylolpropane-Sorbitol | 1.7 | 4 | 224 | 44.4 | 1.17 | 2.0 | 40 |
| 5 | do | 2.0 | 4 | 269 | 49.8 | 1.16 | 1.7 | 17 |
| 6 | Glycerine | 3.0 | 3 | 211 | 49.7 | 1.06 | 2.3 | 16 |
| 7 | Glycerine-Sorbitol | 3.0 | 4 | 225 | 49.2 | 1.27 | 2.3 | 22 |
| 8 | Glycerine | 2.0 | 3 | 216 | 48.1 | 1.09 | 1.8 | 22 |
| 9 | do | 2.0 | 3 | 216 | 48.1 | 1.13 | 1.6 | 20 |

Example 10.—Properties of polyurethane foam prepared from chlorine-containing triol A polyurethane foam was prepared in the manner of the preceding examples from tolylene diisocyanate and a glycerine-based triol prepared by the addition of a 2:1 mole ratio mixture of 1,1,1-trichloro-2,3-epoxypropane and propylene oxide to glycerine, and having a theoretical equivalent weight of 221 and a chlorine content of 48.2%. The product was prepared using an isocyanate index of 1.05 based on a theoretical equivalent weight of the polyol of 221. The results of tests of the foam are summarized in Table III.

TABLE III.—PROPERTIES OF RIGID FOAM FROM CHLORINE-CONTAINING TRIOL

Density, lbs./ft.³ _____ 1.86
Compression strength, p.s.i.:
  5% deflection _____ 12.8
  10% deflection _____ 15.1
  25% deflection _____ 16.0
Deflection, percent at yield point _____ 8.6
Yield strength, p.s.i. _____ 17.4
Tensile strength, p.s.i. _____ 19.1
K factor _____ 0.155
Burning rate, self-extinguishing, sec. _____ 36
Humid aging at 158° F., 100% R.H., percent volume increase:
  24 hours _____ 10.6
  48 hours _____ 19.7
  1 week _____ 31.2

Example 11

A series of three polyurethane foams was prepared from tolylene diisocyanate and the glycerine-initiated triol from 1,1,1-trichloro-2,3-epoxypropane and propylene oxide used in Examples 8 and 9, and using an 80:20 mixfoam prepared using 7.5 g. of Freon 11 was the strongest of the three. It was also found that the use of more silicone, 0.3 g., increased the flexibility of the foam.

Example 12.—Preparation and testing of polyurethane films

Polyurethane coating compositions were prepared using three different formulations, as summarized in Table IV. For Formulation 47, a polytrichloropropylene glycol with a molecular weight of 1003 (PR–664–1) was reacted with a prepolymer (PR–960), using 0.1% dibutyltindilaurate catalyst and ethylene dichloride solvent. The polychloropropylene glycol was prepared by first forming 3,3,3-trichloro-1,2-propylene glycol by hydrolyzing 3,3,3-trichloro-1,2-propylene oxide with dilute sulfuric acid, adding $BF_3$ etherate to the 3,3,3-trichloro-1,2-propylene glycol, and then adding more 3,3,3-trichloro-1,2-propylene oxide to give a product with a molecular weight of 1003. The prepolymer was prepared by reacting 2 equivalents of tolylene diisocyanate with a polyhydroxy ether (TP–1540; MW–1535) prepared from 1 mole of trimethylolpropane and 24 moles of propylene oxide.

Two other polyurethane coating compositions are also described in Table IV, one in which the polytrichloropropylene glycol was replaced by a copolymer (PR–1235–A) which had a molecular weight of 932 prepared from equimolar proportions of trichloropropylene oxide and dichloropropylene oxide (formulation 46–1), and one in which the trichloropropylene oxide was replaced by a polypropylene glycol with a molecular weight of 400 (Pluracol P–410) (formulation 48).

Each of the polyurethane coating compositions was applied to aluminum panels. The coatings were allowed to air dry at room temperature for 2 hours and then cured by heating at 50° C. for 16 hours. The peel strength and the thickness of the cured films were measured, the data being listed below in Table V. A value, termed the "intrinsic adhesion," was obtained by extrapolating the curves to zero thickness. A comparison of the intrinsic adhesion values shows that the adhesion of the films prepared from the polytrichloropropylene glycol and from the copolymer prepared from trichloropropylene oxide and dichloropropylene oxide was much higher than the adhesion of the film prepared from the non-halogen containing glycol. Moreover, there is a difference in the intrinsic adhesion of the two films prepared from the halogen-containing glycols, the film prepared from the polytrichloropropylene glycol having a higher adhesion than the film prepared from the copolymer of trichloropropylene oxide and dichloropropylene oxide, which contained a lower proportion of halogen.

Polychloropropylene glycol PR-664-1 is 1,1,1-trichloro-2,3-propylene glycol prepared as described above.

In a second test, the correlation between the film strength and the amount of polytrichloropropylene glycol incorporated in the film was investigated. Polyurethane formulations containing varying proportions of polytrichloropropylene glycol with a molecular weight of 1003 (PR-664-1), prepared as described above, and a polypropylene glycol with a molecular weight of 400 (P-410) were prepared according to the compositions shown in Table VI.

TABLE VI.—POLYURETHANE COATING COMPOSITIONS

| Example | Prepolymer PR-960, grams | Polychloropropylene glycol PR-664-1, grams | Polypropylene glycol P-410, grams | Equivalent ratio PR-664-1/P-410 | Ethylene dichloride solvent, grams | DBTDL [1] catalyst, percent |
|---|---|---|---|---|---|---|
| 13 | 8.98 | | 2.05 | | 11 | 0.1 |
| 14 | 8.98 | 5.02 | | | 14 | 0.1 |
| 15 | 8.98 | 2.51 | 1.03 | 50:50 | 13 | 0.1 |
| 16 | 8.98 | 3.77 | 0.51 | 75:25 | 13 | 0.1 |
| 17 | 8.98 | 1.25 | 1.54 | 25:75 | 12 | 0.1 |

[1] DBTDL=Dibutyltindilaurate.

Each of these polyurethane coating compositions was applied to aluminum panels. The coated compositions

TABLE IV.—POLYURETHANE COATING COMPOSITIONS

| Formulation number | Prepolymer PR-960, grams | Copolymer DCPO plus TCPO PR-1235-A, grams | Polychloropropylene glycol PR-664-1, grams | Pluracol P-410, grams | Ethylene dichloride solvent, grams | DBTDL [1] catalyst, percent |
|---|---|---|---|---|---|---|
| 46-1 | 8.98 | 4.66 | | | 14 | 0.1 |
| 47 | 8.98 | | 5.02 | | 14 | 0.1 |
| 48 | 8.98 | | | 2.05 | 11 | 0.1 |

[1] DBTDL=Dibutyltindilaurate.

TABLE V.—ADHESION OF POLYURETHANE FILMS TO ALUMINUM METAL

| Formulation 46-1 | | Formulation 47 | | Formulation 48 | |
|---|---|---|---|---|---|
| Thickness, mils | Peel Strength, grams | Thickness, mils | Peel Strength, grams | Thickness, mils | Peel Strength, grams |
| 4 | 121 | 2.5 | 148 | 2.5 | 36.6 |
| 4.5 | 132 | 3 | 161 | 3 | 37.1 |
| 4.5 | 141 | 4 | 174 | 3 | 37.6 |
| 6 | 156 | 4.5 | 191 | 4 | 36.7 |
| 6.5 | 162 | 5 | 203 | 5 | 37.0 |
| 7 | 163 | 5 | 213 | 6 | 36.8 |
| 8 | 186 | 5.5 | 212 | 7 | 37.9 |
| 9 | 199 | 6 | 237 | 7 | 37.3 |
| 9 | 203 | 6.5 | 237 | 7 | 36.7 |
| 10 | 220 | 6.5 | 236 | 7.5 | 38.2 |
| 10 | 228 | 7 | 260 | 7.5 | 37.7 |
| 10.5 | 230 | 7 | 256 | 8 | 36.9 |
| 11 | 228 | 8.5 | 288 | 9 | 36.9 |
| 11.5 | 241 | 9 | 290 | 9.5 | 37.3 |
| | | | | 10 | 36.0 |
| | | | | 11 | 37.0 |
| | | | | 12 | 37.1 |
| | | | | 12.5 | 38.1 |
| | | | | 12.5 | 37.9 |
| | | | | 13 | 36.9 |
| | | | | 13.5 | 38.0 |
| | | | | 13.5 | 36.8 | were cured in the manner described above and the peel strengths and film thickness of the cured films were measured. The data are listed below in Table VII.

A comparison of the intrinsic adhesion values shows that the adhesion of the films containing the highest proportion of polytrichloropropylene glycol had the highest adhesion strength and that as the proportion of polytrichloropropylene glycol in the composition became less, the peel strength of the films decreased.

TABLE VII.—ADHESION OF POLYURETHANE FILMS TO ALUMINUM METAL

| Example 13 | | Example 14 | | Example 15 | | Example 16 | | Example 17 | |
|---|---|---|---|---|---|---|---|---|---|
| Thickness, mils | Peel strength, grams | Thickness, mils | Peel strength, grams | Thickness, mils | Peel strength, grams | Thickness, mils | Peel strength, grams | Thickness, mils | Peel strength, grams |
| 3 | 39 | 2.5 | 152 | 3 | 55 | 3 | 89 | 2 | 34 |
| 3.5 | 35 | 3 | 158 | 5 | 53 | 3.5 | 93 | 4 | 35 |
| 4.5 | 42 | 3.5 | 170 | 6 | 59 | 3.5 | 95 | 5 | 42 |
| 6 | 35 | 4 | 197 | 7 | 58 | 4 | 99 | 7 | 41 |
| 6 | 41 | 5 | 197 | 10 | 60 | 4 | 103 | 8 | 48 |
| 6.5 | 35 | 5.5 | 210 | 10 | 64 | 4 | 107 | 9 | 48 |
| 7.5 | 41 | 6 | 222 | 11 | 60 | 4 | 109 | 10 | 44 |
| 8 | 36 | 6 | 232 | 11 | 70 | 4.5 | 106 | 11 | 48 |
| 9.5 | 39 | 6.5 | 232 | 12 | 68 | 4.5 | 111 | 12 | 46 |
| 9.5 | 42 | 7 | 253 | 13 | 65 | 4.5 | 113 | 13 | 49 |
| 10 | 36 | 7 | 258 | 14 | 69 | 4.5 | 116 | | |
| 11 | 41 | 8.5 | 285 | 16 | 69 | 5 | 119 | | |
| 11 | 36 | 9 | 289 | 16 | 72 | 6 | 172 | | |
| 12.5 | 38 | | | 17 | 72 | 7 | 147 | | |
| 12.5 | 41 | | | | | 8 | 157 | | |
| 13.5 | 37 | | | | | 9 | 172 | | |
| | | | | | | 10 | 171 | | |
| | | | | | | 10 | 173 | | |
| | | | | | | 11 | 184 | | |
| | | | | | | 12 | 202 | | |
| | | | | | | 14 | 227 | | |
| | | | | | | 15 | 236 | | |
| | | | | | | 15 | 241 | | |
| | | | | | | 16 | 247 | | |
| | | | | | | 16 | 255 | | |
| | | | | | | 16 | 257 | | |
| | | | | | | 17 | 260 | | |
| | | | | | | 17 | 266 | | |

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A polyurethane composition having improved fire resistance comprising the reaction product of:
   (I) an organic polyisocyanate and
   (II) an active hydrogen-containing polyhalogenous polyhydroxy ether produced by reacting together
      (1) an alkylene oxide containing three to four carbon atoms, inclusive, and having an alkyl group attached to a carbon atom of the oxirane ring, said alkyl group having a maximum of two carbon atoms and two chlorine atoms bonded to the same terminal carbon atom, and
      (2) a member selected from the group consisting of
         (a) alkylene oxides having no more than one halogen atom on a single carbon atom,
         (b) polyhydroxy initiating compounds having a maximum of eight hydroxy groups, and
         (c) mixtures thereof,
            said polyhalogenous polyhydroxy ether (II) being characterized by the presence of pendent polyhalogenous alkyl groups having a maximum of two carbon atoms, and having two chlorine atoms bonded to the same terminal carbon atom, and
   (III) an effective amount of a catalyst for promoting the reaction between said polyisocyanate (I) and said ether (II).

2. A composition according to claim 1, wherein said alkylene oxide (1) is 1,1-dichloro-2,3-epoxypropane.

3. A composition according to claim 1, wherein said alkylene oxide (1) is 1,1-dichloro-2,3-epoxypropane and said initiating compound (2)(b) is glycerine.

4. A composition according to claim 1, wherein said alkylene oxide (1) is 1,1-chloro-2,3-epoxypropane and said initiating compound (2)(b) is pentaerythritol.

References Cited

UNITED STATES PATENTS

| 3,054,756 | 9/1962 | Hotschmidt et al. | 260—2.5 |
| 3,087,901 | 4/1963 | Brown | 260—2.5 |
| 3,219,634 | 11/1965 | Watson et al. | 260—77.5 |
| 3,244,754 | 4/1966 | Bruson et al. | 260—615 |
| 3,269,961 | 8/1966 | Bruson et al. | 260—2.5 |

FOREIGN PATENTS

| 527,462 | 7/1956 | Canada. |
| 1,160,172 | 12/1963 | Germany. |

DONALD E. CZAJA, *Primary Examiner.*

F. McKELVEY, *Assistant Examiner.*

U.S. Cl. X.R.

117—132, 138.8, 148, 161; 260—2.5, 33.2, 33.6, 615